United States Patent [19]

Mukhopadhyay et al.

[11] Patent Number: 5,266,203

[45] Date of Patent: Nov. 30, 1993

[54] METHOD FOR TREATING PROCESS STREAMS CONTAINING CYANIDE AND HEAVY METALS

[75] Inventors: Debasish Mukhopadhyay, Cupertino; Dan Bergamini, Byron, both of Calif.

[73] Assignee: Arrowhead Industrial Water, Inc., Lincolnshire, Ill.

[21] Appl. No.: 828,314

[22] Filed: Jan. 30, 1992

[51] Int. Cl.$^5$ .............................................. B01D 15/04
[52] U.S. Cl. ................... 210/638; 210/639; 210/652; 210/688; 210/749; 210/912
[58] Field of Search ............... 210/638, 639, 650, 651, 210/652, 681, 688, 634, 908, 912, 749, 195.2, 257.2, 763, 759, 724, 747; 252/82

[56] References Cited

U.S. PATENT DOCUMENTS

| | | | |
|---|---|---|---|
| 4,014,787 | 3/1977 | Shorr | 210/651 |
| 4,040,834 | 8/1977 | Iwano et al. | 210/639 |
| 4,312,760 | 1/1982 | Neville | 210/724 |
| 4,357,254 | 11/1982 | Kapiloff et al. | 252/82 |
| 4,394,356 | 7/1983 | Peuser et al. | 210/912 |
| 4,462,713 | 7/1984 | Zurcher et al. | 210/747 |
| 4,574,049 | 3/1986 | Pittner | 210/639 |
| 4,622,149 | 11/1986 | Devuyst et al. | 210/763 |
| 4,775,480 | 10/1988 | Milton et al. | 210/195.2 |
| 4,851,129 | 7/1989 | Griffiths et al. | 210/759 |
| 4,880,511 | 11/1989 | Sugita | 210/652 |
| 4,988,444 | 1/1991 | Applegate et al. | 210/636 |
| 5,015,396 | 5/1991 | D'Orazio et al. | 210/763 |
| 5,017,291 | 5/1991 | Semler et al. | 210/650 |
| 5,087,372 | 2/1992 | Toyomoto et al. | 210/912 |
| 5,106,508 | 4/1992 | Schwitzgebel | 210/912 |
| 5,112,489 | 5/1992 | Hartman | 210/195.2 |

OTHER PUBLICATIONS

Mike Irish, "Heap Leaching and the 100 Year Flood", Feb. 1987, 14 pages, hand-out at Society of Mining Engineers Conference.

Primary Examiner—Robert A. Dawson
Assistant Examiner—David Reifsnyder
Attorney, Agent, or Firm—George W. Moxon, II

[57] ABSTRACT

An apparatus and method for treating streams containing cyanide, heavy metal and precious metal values to recover those values where the method includes the following steps:

a) providing a membrane filtration means having an inlet, a product outlet and an discharge outlet, b) contacting the waste stream to be treated with an effective amount of carbon dioxide to adjust the pH to about 8.0 to about 10.0, c) further contacting the waste stream with an effective amount of a soluble metal compound to react with the cyanide in the waste stream to form membrane rejectable cyanide compounds, and d) passing the treated stream through the membrane filtration means to thereby separate recoverable cyanide and precious metal values from the treated stream and produce an effluent stream for further processing or discharge to the environment.

15 Claims, 3 Drawing Sheets

METHOD FOR TREATING PROCESS STREAMS CONTAINING CYANIDE AND HEAVY METALS

BACKGROUND OF THE INVENTION

This invention relates to a method for treating process streams to achieve the removal of cyanide, as well as simultaneous removal of heavy metals such as copper, zinc, arsenic, aluminum, lead, nickel, and the like, and precious metals, such as gold, silver, cobalt, platinum, and the like. More specifically, this invention relates to methods and apparatus for removing cyanide, heavy metals and precious metals without destroying the value inherent in those components, utilizing a membrane filtration system, while producing an effluent stream low in contaminants.

Leaching processes (milling or heap) are commonly used to extract gold and other precious metals from ore using various cyanide solutions. The solutions are passed through the ore to leach the precious metals through solubilization, thereby creating a "pregnant" solution, i.e., a solution rich in precious metals. The precious metals are then separated from the pregnant solution. After separation, a "barren" solution remains, but in fact, it is rich in cyanide and still contains low levels of precious metals. Barren solutions are typically reused in the leach process (based upon cyanide content) or treated to destroy and/or remove the cyanide and heavy metals.

Various techniques have been utilized to recover cyanide and heavy and precious metals. Usually, these methods accomplish only one of the objectives at a time to the exclusion of the other values present, for example, where cyanide is destroyed in the process of recovering the precious metals.

Techniques available for removing cyanide by destruction include addition of and reaction with oxidants such as sulfur dioxide, hydrogen peroxide, sodium hypochlorite and chlorine in various forms, as well as metal salts such as copper sulfate, ferrous and ferric salts, and the like, singly or in combination. See, for example, U.S. Pat. Nos. 5,015,396; 4,622,149; 4,851,129 and 4,312,760.

Known methods utilized to remove heavy metals from aqueous solution include precipitation as metal oxide, hydroxide, and oxyhydroxide, adsorpion with or without ion-exchange resins, and the like. Precious metals can be recovered by any number of well known techniques, including ion exchange, carbon adsorption, electrowinning, and zinc precipitation.

The discharge of industrial effluents containing cyanide alone or along with the heavy metal components, are also avoided by their placement in secure storage facilities such as lined ponds and lagoons. But even these present a constant hazard because of possible leaks and percolation into aquifers, spills during periods of heavy rains or snow melts, such as the spring, when the facilities can exceed their expected capacity with the potential of polluting fresh water supplies, and potential wildlife kills such as birds landing on and drinking cyanide laden water.

Consequently, there is a need for a safe, effective and inexpensive method of removing cyanides and cyanide heavy-metal components from aqueous effluents without destroying the values contained therein.

Reverse osmosis and nano filtration are techniques that has been employed to remove dissolved solids from municipal water supplies. For example U.S. Pat. No. 4,574,049 to G. A. Pittner teaches a chemically enhanced reverse osmosis water purification system. But, reverse osmosis has not been well received in the mining industry because the constituents in the process streams including the cyanide compounds tend to foul the membranes employed or may involve pH levels which are too high for the materials of construction used in the membranes or may leave high levels of cyanide or heavy metals in the discharge stream. One example of the use of reverse osmosis in mining is U.S. Pat. No. 4,462,713 to A. K. Zurcher et al, which is directed to a method for mining and reclaiming land. As part of the process, after the major minable products are removed, sodium carbonate is added to the filtrate to remove excess calcium before the filtrate is subjected to reverse osmosis, ion exchange, or electrodialysis to provide fresh water, but without trying to preserve, e.g., cyanide values.

SUMMARY OF THE INVENTION

The present invention is a method and apparatus whereby cyanide alone or in combination with heavy and/or precious metals present in aqueous streams can be removed by a reverse osmosis (RO), ultrafiltration (UF), nano filtration (NF), or the like membrane filtration system. For the purposes of this application, RO, UF, and NF will be collectively referred to as membrane filtration systems.

When the process of the present invention is employed, the effluent stream contains essentially no cyanide or heavy metals, and so could be a purified discharge stream. The product or recoverable stream contains essentially all the cyanide and heavy and/or precious metals present in the process or feed stream. The recoverable stream can be returned to the processing system, thereby reducing the need for addition of fresh cyanide and/or heavy metal components, and permitting recovery of the precious or heavy metals. The precise steps to be taken will depend upon the process stream being treated since this invention has applicability to a wide variety of process streams.

For the purposes of this invention, the term product stream is intended to mean and include the recoverable stream, the reject stream, the rich stream, or the concentrate stream, which includes the cyanide, heavy and precious metals separated from the feed stream in the membrane filtration means. The term discharge stream is intended to mean and include the lean stream, the permeate, the effluent stream, or the clean water stream, which is left after the cyanide and precious and heavy metal values have been extracted by the membrane filtration means.

In the method of the present invention, the feed stream (from a chemical process) containing cyanide, heavy metal and precious metal values is contacted with an effective amount of carbon dioxide to adjust the pH to a range of about 8.0 to about 10.0 and an effective amount of a soluble metal compound, such as highly soluble copper, nickel, iron, or zinc salts of chloride, sulphate, and the like, which will react with the cyanide in the feed stream and form membrane rejectable cyanide compounds before passing the treated stream to the membrane filtration means, where cyanide and heavy and precious metal values are separated, as a product stream, from the treated feed stream to produce a discharge stream which can be discharged to the environment, reused or recycled, such as for washing and/or detoxifying spent heaps, or subjected to further processing.

It is also contemplated that a combination of agents, such as combining the carbon dioxide and soluble metallic salt with citric or oxalic acids, scale inhibitors, and/or dispersants, can be added to the aqueous stream to make it an acceptable feed for the membrane filtration system. By this pre-conditioning process, calcium carbonate, metal hydroxides and/or oxides, metal-cyanogen complexes, or hydrocyanic acid polymers will not foul the membrane and render it inoperable.

The apparatus for treating a feed stream containing cyanide and heavy and precious metals to recover those values comprises a membrane filtration means for separating the cyanide, heavy metals, and precious metals from the process stream having a process or feed stream inlet, a product stream outlet, and discharge stream outlet, a means for contacting said feed stream with carbon dioxide to treat thereby the feed stream and adjust the pH of said feed stream to about 8.0 to 10.0 pH, a means for contacting the feed stream with a soluble metal compound to treat thereby the feed stream further and react the cyanide in said feed stream to form membrane rejectable cyanide compounds, and a pump for increasing the pressure of the treated feed stream to about 150 to 1500 psi so the membrane filtration means will function to achieve the necessary separation.

If the membrane filtration means eventually does foul and lose efficiency due to accumulation of foulants or precipitants on the membrane surface, the membrane can be cleaned or regenerated in situ without the use of undesirable chemicals. By using the discharge stream, combined with added carbon dioxide and/or acidic feed material, and passing the combination through the system the membrane foulants will be solubilized, as will any calcium carbonate, metal salts and complexes, silt material and hydrocyanic acid polymer, and those materials can be discharged via the product stream.

In another embodiment of the process and apparatus of the present invention, a second membrane filtration means can be employed in a double pass filtration system to further reduce the cyanide and heavy metals levels in the discharge stream. In the double pass system, alkaline and/or soluble metal salt material are employed before the second pass to enhance the removal of the cyanide and heavy metals.

DETAILED DESCRIPTION OF THE INVENTION

Figure 1:
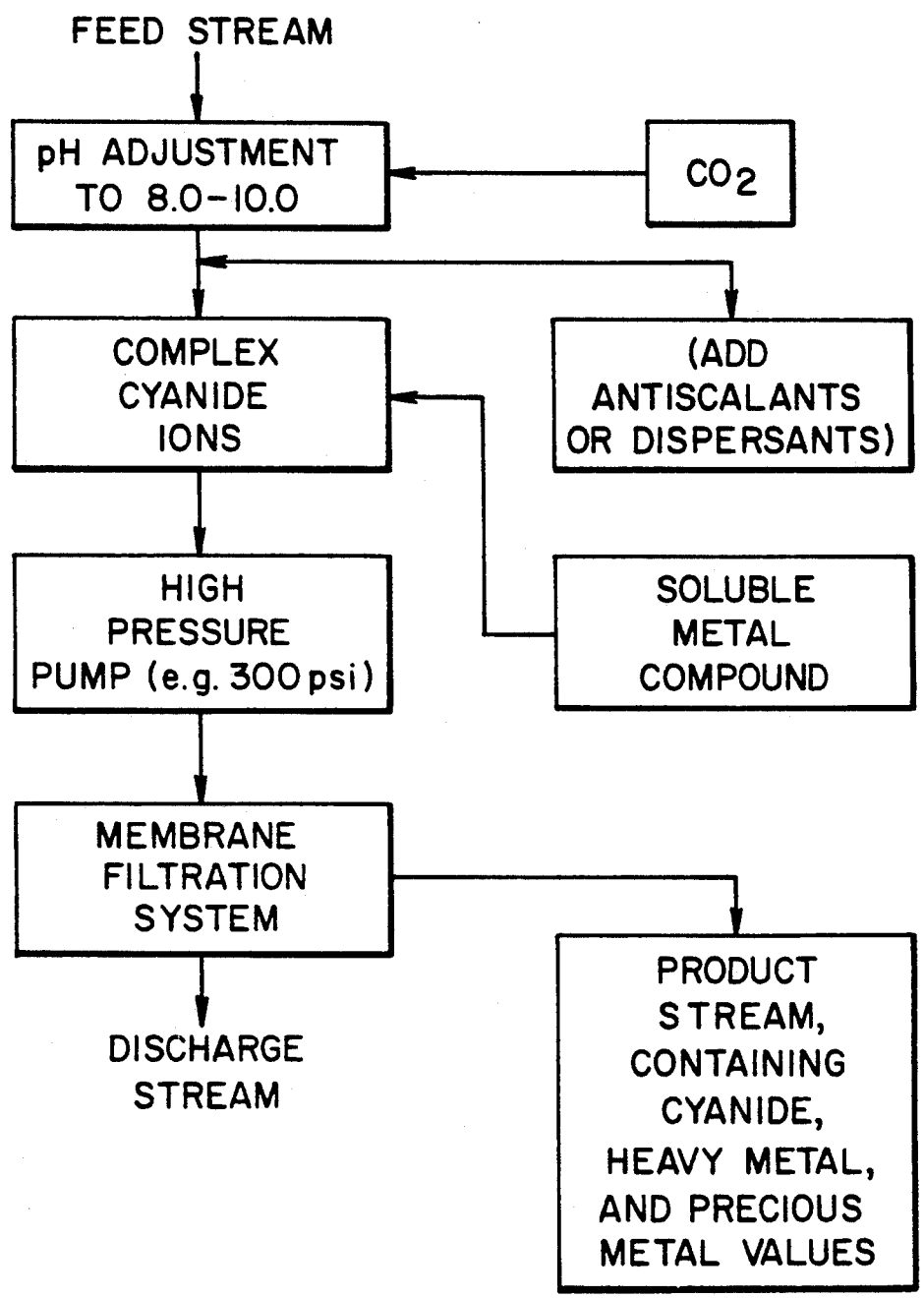
FIG. 1 is a process flow diagram of the method of the present invention.

As seen in the process flow diagram shown in FIG. 1, the process basically involves pretreating a process or feed stream containing cyanide, heavy and precious metal values with carbon dioxide ($CO_2$) to adjust the pH to a range of about 8.0 to 10.0, next mixing the feed stream with a soluble metal compound to form membrane rejectable cyanide compounds, before passing the treated feed stream through a membrane filtration apparatus to thereby separate the treated feed stream into "rich" and "lean" streams. The "rich" or product steam is a recoverable stream containing all or substantially all the cyanide, heavy and precious metal values from the waste stream. The "lean" or discharge stream is the effluent or discharge stream from which the cyanide and heavy metal valves have been removed.

The term membrane rejectable cyanide compounds is intended to include most cyanide compounds, except for hydrogen cyanide (HCN). Normally the membrane rejectable cyanide compounds will be complex salts of the cyanide ($CN-$) ion, including metal cyanogen complexes ($M(CN)_x$) such as sodium cupricyanide, $Na[Cu(CN)_3]$.

Figure 2:
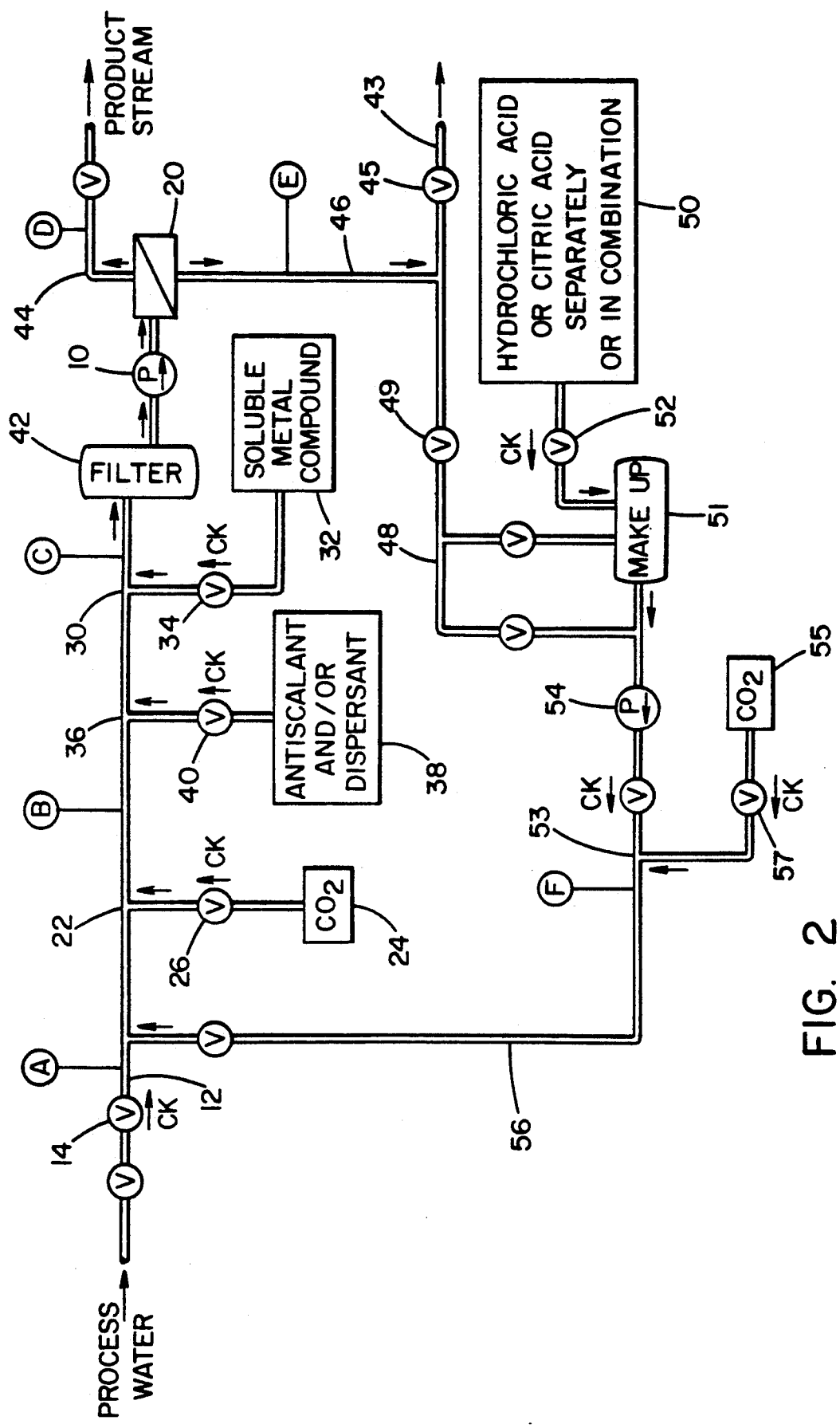
FIG. 2 is a schematic of an apparatus in accordance with one embodiment of the present invention.
Figure 3:
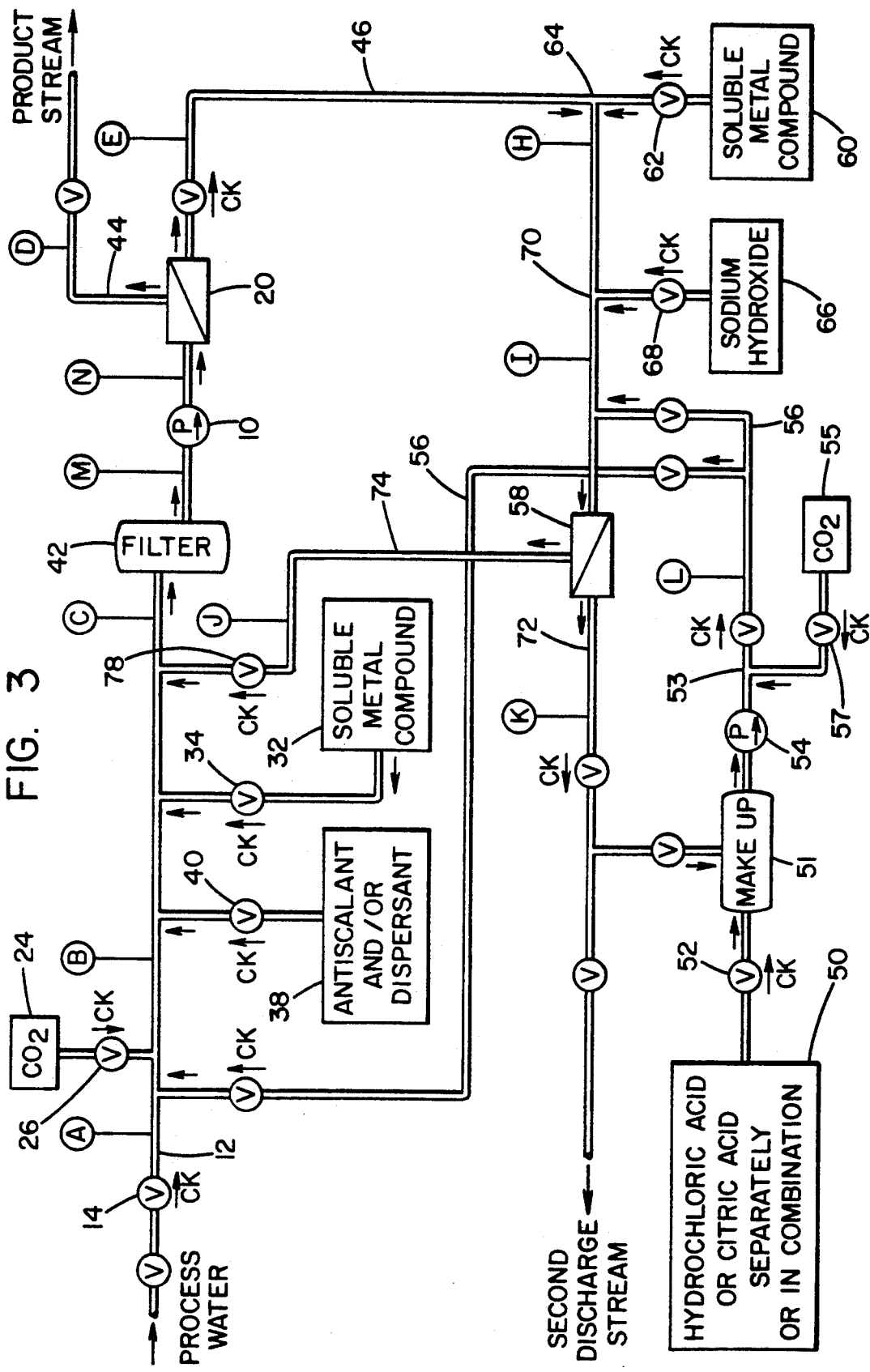
FIG. 3 is a schematic of an apparatus in accordance with a second embodiment of the present invention.

The apparatus is shown schematically in the drawings in FIGS. 2 and 3 where the membrane separation system includes a high pressure pump 10, which may be controlled by an on/off or automatic switch (not shown) which is used to pump the feed stream supplied by line 12 from, e.g., a recovery system for a gold mine, to the membrane filtration system and to increase the pressure of the feed stream so the membrane filtration means will function to separate the cyanide, heavy metals, and precious metals from the feed stream. Although the invention will be described in terms of a process stream from a gold mine, it will be appreciated by those in the art that the process and apparatus illustrated herein can be used in other processes, such as metal plating and the like where there are cyanide and heavy or precious metal values which are recoverable. The feed stream flows through a check valve 14 which prevents the stream from returning or backing into the process (not shown). As the feed stream flows towards the membrane filtration means 20, which can be a reverse osmosis membrane, a nano filtration system or the like, it is contacted at point 22 with carbon dioxide fed from a source 24 which can be a liquid or gaseous $CO_2$ supplied through check valve 26. The amount of carbon dioxide, which will be injected as a gas, will vary depending upon the conditions of the feed stream, but should be an effective amount to adjust the pH of the feed stream to about 8.0 to 10.0, with a pH of 8.5 to 9.5 being preferred. Appropriate gauges or measuring devices will be employed to measure critical values in monitoring the system, and these are indicated by A, B, C, D, E and F in FIG. 2, and, additionally, H, I, J, K, L, M and N in FIG. 3. Typical values being reported include liquid flow rate, pressure, temperature, pH and concentration of key values such as cyanide or heavy or precious metals. These data points can be provided on a continuous or periodic basis.

Feed stream 12 is further treated at point 30 by contacting it with a soluble metal compound supplied at 32 through check valve 34. An effective amount of soluble metal compound is reacted with the cyanide in the feed stream to form a membrane rejectable cyanide compound. The exact amount of soluble metal compound will depend upon the contents of the feed stream since, depending upon the process, it could contain sufficient soluble metal compound so that the cyanide values are in the form of membrane rejectable compounds. So the amount added could be zero, but it usually will be more than zero and be determined based upon feedback from the product and discharge streams, i.e., monitoring points D and E in FIGS. 2 and 3. For example, where high cyanide values are measured at point E in FIG. 2, the amount of soluble metal compound added would be increased to increase the formation of membrane rejectable cyanide compounds. The soluble metal compound is preferably a copper, iron, nickel or zinc sulfate or chloride or the like. Usually, the solid salt will be made into a 5 to 10% by weight solution and the solution will be injected into the feed stream.

There is nothing critical about the injecting and mixing of the carbon dioxide, soluble metal compound or the antiscalant or dispersant. Where the supply is under pressure it can be released via a valve. Where it is a liquid, it can be supplied by a pump. The injection and mixing can be simply a "tee" in the piping where the feed pipes are joined.

It may be appropriate to add at 36 other antiscalant and/or dispersant compositions from source 38 through check valve 40 depending on the composition of the materials in the feed stream 12 to facilitate the separation process and to minimize fouling of the membrane. Antiscalants operated by modifying the crystal structure of the foulants, such as for example calcium carbonate, which when precipitated are friable and soft and amendable to flusing and cleaning. Dispersants operate by keeping suspended solids, such as silt, in a dispersed condition and hindering settling characteristics. These can be various organic and organic-inorganic materials, including acrylates and phophonates. To ensure that finely suspended solids such as silt, filter aid, and the like to not block or foul the membrane, it is customary to pass the feed stream through a sieve filter, such as cartridge filter 42, to remove such particles (e.g., 1 to 10 microns) from feed stream 12.

High pressure pump 10 will raise the pressure of the feed stream up to about an appropriate pressure, which may range from 150 to 1500 psig and feed it into the membrane filtration means 20. The exact pressure will depend upon the membrane filtration means employed. Any conventional reverse osmosis membrane or nano filtration membrane can be employed for the purposes of this invention. Nano filtration typically operates at up to 150 pounds per square inch gauge (psig) feed pressure and is very effective for removal of dissolved materials that are of medium to high molecular weight. Nano filtration is not as effective at removing dissolved inorganic ions. Reverse osmosis is operable at up to 1500 psig pressure and is very effective for removal of all dissolved solids, both low and high molecular weight. Other membrane filtration means include ultrafiltration, electrodialysis, continuous deionization, and the like. The choice of the membrane filtration system will also be influenced by the presence of fine "silty" materials which are capable of clogging the active layer interface. The membrane filtration means 20 will separate the feed stream 12 into a product stream 44 which is rich in cyanide, heavy metals and precious metals and a discharge stream 46 which may be reused or discharged to the environment.

If cartridge filter 42 is unable to remove foulants and the membrane loses its efficiency due to accumulation of the foulants on the membrane surface, the membranes can be cleaned by utilizing a volume of the stored discharge stream 46 and flowing it back through the system via line 48 after opening valve 49, which in its closed position would force discharge stream 46 out of the system out line 43 when valve 45 is open. In the cleaning step, hydrochloric acid or citric acid sourced from source 50 is passed through check valve 52 to make up tank 51 from whence it can be added to stream 48, or carbon dioxide gas can be added directly at 53 from source 55 via check valve 57 to thereby lower the pH of discharge stream 46. Pump 54 will circulate cleaning solution from tank 51 via line 56 through the system where the mixture will solubilize any accumulation of foulants in the system or on the membrane surface and they can be discharged out discharge line 46 and out of the system via line 43 or in any other appropriate manner. During such cleaning, the original feed to the filtration system is not admitted.

The membrane filtration system of the present invention will typically fractionate the incoming feed stream into a "rich" fraction representing 25 to 35% of the original feed volume and containing substantially all of the cyanide and heavy and precious metals contained in the original process stream, and a "lean" fraction represents 65 to 75% of the original feed volume and containing very low levels of cyanides and heavy metals. The water treated by the method of the present invention can achieve levels which would meet ground water quality standards, and thus could be discharged. Of course, the precise contents will vary depending upon the feed stream being treated, so further processing of the discharge stream is possible. The "rich" fraction, i.e., the recoverable stream, can be recycled into the ore-processing circuit where the values of cyanide and metals, particularly copper, silver and gold, can be recovered.

Another embodiment of the present invention is shown in FIG. 3 where a second membrane filtration means 58 is placed in series with the membrane filtration means 20. The use of two membrane filtration means, referred to as a double-pass system, provides an enhanced purification of the discharge stream 46 coming from membrane filtration means 20. The effluent in line 46 is mixed with a soluble copper or zinc salt supplied at 60 via a check valve 62 for mixing with the effluent stream at 64. Further, sodium hydroxide sourced from source 66 is fed by a check valve 68 to mix with discharge stream at 70 and passage to second membrane filtration means 58. Membrane filtration means 58 will produce a second discharge stream 72 and a recycle product stream 74 which can be combined with process or feed stream 12 at point 76, via check valve 78. The addition of a soluble copper or zinc salt will complex any cyanide in discharge stream 46 making it membrane rejectable for recovery and circulation back to the system by line 74. The addition of sodium hydroxide will serve to convert undissociated cyanides into dissociated cyanide anions and/or metal-cyanogen complex which are rejected by the second membrane filtration system and pass out by line 74.

To illustrate the present invention, typical values for various parameters of a process representative of the present invention embodied in FIG. 2, which is referred to as a one-pass system, are presented in Table 1. Since the process is operated in a continuous manner, the measurements presented are typical, with a variance of no more than 20% being expected. The parameters are measured by appropriate measuring device located at the points shown in FIG. 2 indicated as A, B, C, D, E and F. The data measured at these points include a rate of flow (gallons per meter), pressure (pounds per square inch gauge), temperature (°F), pH, parts per million of dissolved solids, amount of gold (Au) in ounces per ton of liquid, copper (Cu), calcium (Ca), and cyanide (CN) in parts per million (i.e., milligrams per liter of solution). Some of these measurements are done on a continuous basis, while some of the measurements are made occasionally. The frequency is noted in the tables. The tables show that substantially all the cyanide, heavy metals and precious metals present in feed stream 12 and measured at point A are recovered in product stream 44, measured at point D, while very little cyanide and/or heavy or precious metals remain in effluent stream 46 which is measured at point E.

TABLE 1

Typical Process Flow Diagram 1-Pass System

| Characteristics | Location | | | | | |
|---|---|---|---|---|---|---|
| | A | B | C | D | E | F |
| Flow, g/m | 75 | 75 | 75 | 25 | 50 | 60 |
| Press, psig | 40 | 40 | 40 | 200 | 10 | 100 |
| Temp, °F. | 40 | 40 | 40 | 41 | 42 | 40 |
| pH | 10.5 | 9.0 | 9.0 | 9.5 | 8.6 | 5.0 |
| Total Dissolved Solids, ppm | 1,500 | 1,500 | 2,600 | 4,500 | 160 | 160 |
| Au, oz/ton of liquid | 0.002 | 0.002 | 0.002 | 0.006 | | |
| Cu, ppm | 20 | 20 | 50 | 150 | <2 | <2 |
| Ca, ppm | 250 | 250 | 250 | 750 | <5 | <5 |
| CN, ppm | 200 | 200 | 200 | 550 | 20 | 20 |
| Continuous/Occasionally | Cont | Cont | Cont | Cont | Cont | Occ |

Table II presents typical values at points A, B, C. D, and E and additionally at points H, I, J, K, L, M and N in a double or two-pass system, representative of a further embodiment of the present invention illustrated in FIG. 3. The measurements at point D show that substantially all the cyanide and precious metal values are recovered from the values measured in the feed stream at point A, while the discharge measured at point E shows a significant reduction in cyanide. Further, the use of a second membrane system produces a greater reduction of the cyanide content in the discharge stream as measured at point K.

TABLE 2

Typical Process Flow Diagram 2-Pass System

| Characteristics | LOCATION | | | | | | | | | | | |
|---|---|---|---|---|---|---|---|---|---|---|---|---|
| | A | B | C | M | N | D | E | H | I | J | K | L |
| Flow, g/m | 137 | 137 | 162 | 162 | 162 | 55 | 107 | 107 | 107 | 107 | 82 | 120 |
| Press, psig | 40 | 40 | 40 | 35 | 600 | 480 | 230 | 230 | 230 | 100 | 10 | 100 |
| Temp, °F. | 40 | 40 | 41 | 41 | 41 | 42 | 43 | 43 | 43 | 45 | 46 | 47 | 40 |
| pH | 10.5 | 9.0 | 9.1 | 9.1 | 9.1 | 9.5 | 8.6 | 8.6 | 10.0 | 10.4 | 9.8 | 5.0 |
| Total Dissolved Solids, ppm | 1,500 | 1,500 | 1,400 | 1,400 | 1,400 | 4,600 | 140 | 150 | 165 | 600 | 10 | 10 |
| Au, oz/ton | 0.002 | 0.002 | 0.002 | 0.002 | 0.002 | 0.006 | 0 | 0 | 0 | 0 | 0 | 0 |
| Cu, ppm | 20 | 20 | 25 | 25 | 25 | 75 | <1 | 10 | 10 | 40 | 0 | 0 |
| Ca, ppm | 250 | 250 | 250 | 250 | 250 | 750 | 5 | 5 | 5 | 20 | 0 | 0 |
| CN, ppm | 200 | 200 | 180 | 180 | 180 | 500 | 20 | 20 | 20 | 80 | 1 | 1 |
| Cont/Occ | Cont | Cont | Cont | Cont | Cont | Cont | Cont | Cont | Cont | Cont | Cont | Occ |

As can be appreciated, the present invention provides a means for removing and recovering cyanide and heavy and precious metal values from process streams. The significant reduction of the cyanide content in the discharge stream means that it can be safely discharged when the levels meet permissible discharge levels or may require only minimal further treatment.

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. A method for treating streams containing cyanide, heavy metal and precious metal values to recover said values comprising the steps of:
   a) providing a membrane filtration means having a feed inlet, a product stream outlet and a discharge stream outlet,
   b) contacting a stream containing cyanide, heavy metal and precius metal values with an effective amount of carbon dioxide to adjust the pH to about 8.5 to about 10.0,
   c) further contacting said stream with an effective amount of a soluble metal compound to react with the cyanide in the waste stream to form membrane rejectable cyanide compounds and to form a treated stream, and
   d) passing said treated stream to said feed inlet and through said membrane filtration means to thereby separate recoverable cyanide and precious metal values from said treated stream as a product stream and produce a discharge stream.

2. The method of claim 1 wherein the soluble metal compound is a soluble copper, iron, nickel, or zinc salt.

3. The method of claim 1 wherein said soluble metal compound is selected from the group consisting of copper sulfate, copper chloride, zinc sulfate, zinc chloride, nickel sulfate, nickel chloride, iron sulfate and iron chloride.

4. The method of claim 1 wherein the pH of said stream is adjusted to about 8.5 to 9.5 pH.

5. The method of claim 1 including the step of adding an antiscalant, dispersant, or combinations thereof to said stream before passing it through said membrane filtration means.

6. The method of claim 1 including the step of passing the effluent stream through a second membrane filtration means having an inlet, a product stream outlet, and a stream outlet, and recycling the product stream outlet back to the inlet of the first membrane filtration means.

7. The method of claim 1 wherein said membrane filtration means is selected from the group consisting of reverse osmosis means, ultrafiltration means, and nano filtration means, and combinations thereof.

8. The method of claim 1 wherein said membrane filtration means is a reverse osmosis filtration means.

9. The method of claim 1 further including the step of periodically cleaning said membrane filtration means by adding a composition to lower the pH of the discharge stream to about 5 to 7 pH stream and recycling the pH adjusted discharge stream back to and through the membrane filtration means to thereby solubilize and remove contaminants from the surface of the membrane filtration means.

10. An apparatus for treating streams containing cyanide, heavy metal and precious metal values to recover said values comprising:
   a) a membrane filtration means for separating said cyanide, heavy metal and precious metal values from a feed stream having an inlet, a product outlet and an discharge outlet,
   b) means for feeding a stream containing cyanide, heavy metals, and precious metals to said filtration means,
   c) means for contacting said stream with carbon dioxide thereby to treat said stream and adjust the pH of said stream to about 8.5 to 10.0 pH,
   d) means for contacting said stream with a soluble metal compound thereby to treat said stream further and convert the cyanide in said stream to form membrane rejectable cyanide compounds, and
   e) pump means for increasing the pressure of the treated stream and feed said treated stream to said inlet of membrane filtration means and thereby separate said treated stream into a product stream containing cyanide, heavy metal and precious metal values and an effluent stream.

11. The apparatus of claim 10 wherein said pump means is capable of producing a discharge pressure of more than about 150 psi.

12. The apparatus of claim 10 wherein said membrane filtration means is selected from the group consisting of reverse osmosis means, ultrafiltration means, nano filtration means, and combinations thereof.

13. The apparatus of claim 10 further including a means for periodically cleaning the membrane of said membrane filtration means.

14. The apparatus of claim 10 further including a means for contacting said stream with antiscalants, dispersants, or combinations thereof.

15. The apparatus of claim 10 further including a second membrane filtration means for separating cyanide, heavy metal, and precious metal values from the discharge stream and recycling them back to the inlet of the first membrane filtration means for recovery thereof.

* * * * *